United States Patent
Grant

[11] Patent Number: 5,287,090
[45] Date of Patent: Feb. 15, 1994

[54] COMBINATION MOUSE AND TRACK BALL UNIT

[76] Inventor: Alan H. Grant, 3208 Woodhollow Dr., Chevy Chase, Md. 20815

[21] Appl. No.: 953,877

[22] Filed: Sep. 30, 1992

[51] Int. Cl.⁵ ............................................. G09G 5/08
[52] U.S. Cl. .................................... 345/163; 345/167
[58] Field of Search ............ 340/710, 706; 74/741 XY

[56] References Cited

U.S. PATENT DOCUMENTS

| | | | |
|---|---|---|---|
| Re. 32,633 | 3/1988 | Hovey et al. ...................... | 340/710 |
| 3,987,685 | 10/1976 | Opocensky ......................... | 340/710 |
| 4,562,347 | 12/1985 | Hovey et al. ...................... | 340/710 |
| 4,818,978 | 4/1989 | Kurihara et al. .................. | 340/710 |
| 4,862,165 | 8/1989 | Gart .................................... | 340/710 |
| 5,175,534 | 12/1992 | Thatcher ........................... | 340/706 |

*Primary Examiner*—Alvin E. Oberley
*Assistant Examiner*—V. Chang
*Attorney, Agent, or Firm*—Jacobson, Price, Holman & Stern

[57] ABSTRACT

A combined mouse and track ball are contained within an ergonomically designed housing or shell. The shell is curved to fit comfortably within the palm of the hand of an operator so that the forefinger and thumb are opposed to each other in a prehensile position. A single shell is operable by a left-handed or right-handed operator by rotation of a switch to change the alignment of the sensor pickups engaging the roller ball of the combined mouse and track ball. At least one switch plate extends across an upper surface of the shell for depression by a forefinger of the operator. The switch plate is pivoted about a central fulcrum so as to have a cursor shifted to a position above an icon located on a computer screen for depression of the switch plate and initiation of the computer function indicated.

14 Claims, 3 Drawing Sheets

COMBINATION MOUSE AND TRACK BALL UNIT

This application is related to design application Ser. No. 07/941,194, filed Sep. 4, 1992 for a Unified Track Ball/Mouse.

FIELD OF THE INVENTION

The present invention relates to computer usage of a cursor control unit having a shell convertible between a mouse and a track ball.

BACKGROUND OF THE INVENTION

A computer is usually equipped to use a "mouse" for movement of a cursor and initiating other functions of the computer. It is oftentimes, however, fatiguing to the operator to use a mouse repeatedly over the course of a day which can result in severe physical strain. Further, specialized equipment has been developed for left versus right-handed computer operators using a mouse. This can add expense to a manufacturer and a retailer to stock a left-hand use mouse and a right-hand use mouse.

An alternate system for controlling movement of a cursor is by the use of a track ball. Oftentimes mounted in front of or to one side of a keyboard, a roller ball of the track ball is rotated to shift a cursor.

The use of a mouse or track ball are alternative systems for controlling a single cursor. Therefore, two pieces of equipment are required if an operator desires the ability to switch back and forth between a track ball and a mouse.

SUMMARY OF THE INVENTION

By the present invention, a combined mouse and track ball are contained within an ergonomically designed housing or shell. The shell is curved to fit comfortably within the palm of the hand of an operator so that the forefinger and thumb are opposed to each other in a prehensile position. A single shell is operable by a left-handed or right-handed operator by rotation of a switch to change the alignment of the sensor pickups engaging the roller ball of the combined mouse and track ball.

At least one switch plate extends across an upper surface of the shell for depression by a forefinger of the operator. The switch plate is pivoted about a central fulcrum so as to have a cursor shifted to a position above an icon located on a computer screen for depression of the switch plate and initiation of the computer function indicated.

To shift from a mouse function to a track ball function, a plurality of bullet switches are depressed so as to be recessed above the lowermost peripheral surface of the roller ball. The shell then performs a mouse functioning. To switch to a track ball function, the shell is again depressed to cause the bullet switches to project from the base of the shell and thereby lift the lowermost peripheral surface of the roller ball above the plane formed by the lowermost edge of the bullet switches or a plane defined between the lowermost edges of the bullet switches and the shell.

Rotation of the roller ball through a front peripheral surface by contact with the thumb of the operator serves to change the position of a cursor. A forefinger located above the switch plate is aligned with the thumb in a prehensile position.

In switching between a track ball and mouse functions, a thumb wheel switch is rotated to one of three positions dependent upon operation of the device as a track ball or for left-hand mouse usage or right-hand mouse usage. Rotation of the thumb wheel changes the position of the horizontal-vertical pickups in contact with the roller ball. To achieve synonymous directionality of cursor movement dependent upon thumb movement of the track ball or mouse hand movement, both the horizontal and vertical pickups are rotated 45 degrees in shifting from the track ball to the mouse mode dependent upon a left-hand usage versus a right-hand usage.

The shell of the mouse and track ball is symmetrically designed for right or left-hand usage. Due to the design of the at least one cursor switch plate, the shell fits all hand sizes.

The shell of the combined mouse/track ball is used with the hand of a user disposed substantially in a prehensile position with the thumb opposed to the fingers in a grasping position. A roller ball on a front surface of the combined mouse/track ball is used for controlling the movement of a cursor and is operated by the thumb of the user. Ulnar abduction and hand-pronation are reduced by using the combined mouse/track ball, thus reducing the incidence of carpal tunnel syndrome.

A mouse/track ball of the invention particularly reduces the onset of severity of, or can prevent entirely, repetitive strain injuries, and other neurological or orthopedic malfunctions, such as tendonitis and tenosynovitis, that are commonly related to usage of a flat and rectangular-type mouse. Stresses on the traditional mouse-user, aside from full hand-pronation, is produced by an air-gap separating a portion of the palm and the forefinger/middle finger from the shell surface of the mouse. The shell of the mouse is held by the thumb and the ring finger/little finger. This is unnatural and unpreferred, as opposed to preferred "tridactyl" holding of objects between the thumb and forefinger/middle finger. Excessive articulation of the middle and distal joints of the forefinger/middle finger in actuating the cursor-control buttons can also cause stress. In this position, percussion of each switch plate is executed in a direction which is essentially away from the action and the range of motion of the opposite thumb.

In contrast, when a hand is positioned for using a biometrically formed, combined mouse/track ball, the hand is advantageously in a prehensile orientation with the ventral surfaces of the thumb and fingers of a hand in opposed positions similar to the positions used for grasping a small object between the thumb and a finger. Prehensility, because it increases the total tactile familiarity with the combination mouse/track ball, can reduce the level of stress on the fingers, hand and wrist.

Advantageously, the entire palm and forefinger/middle finger surface is fully supported by the shell of the invention. There is minimal articulation of the metacarpophalangeal (MCP) joint(s) of forefinger/middle finger to actuate the cursor-control buttons.

When used as a trackball, because virtually the entire hand is fully supported by the shell, there is no stress upon the thumb in its various movements which by friction rotate the trackball. For the same reason the thumb can use the shell surface surrounding the trackball as a "friction-brake" to allow for very fine trackball movements.

A molded shell combined mouse/track ball of the invention having a curvature of a shell which slopes downwardly and away from a comfortable palm rest position allows the hands to be positioned in the optimum prehensile position with a straight hand-wrist posture. This position is substantially stressless when compared with the hand position used for operating a conventional mouse because it permits a relatively straight hand-wrist position and less hand pronation. Carpal tunnel syndrome and other neurological or orthopedic malfunctions are not likely to be manifested while using the combined mouse/track ball described.

The user actuates the cursor control unit in a natural grasp/palmar pinch motion with the hands in a prehensile position, without having to flex the fingers during use and without having to be attuned for a left or right-handed person, other than by a simple switch adjustment.

The cursor control unit or roller ball is operated by the user's thumb by pressing the roller ball inward. Pressure on a portion of the roller ball causes the cursor to move on the display screen in the direction of the portion of the roller ball pressed. The hand is in a prehensile position with the fingers and thumb of a hand in a grasping posture when using the cursor control unit to effectuate precisely refined movement and placement of the cursor on the screen. The cursor control unit may include a roller ball surface which rotates within a yoke to control direction of rotation of two sensor pickup switches extending perpendicular to each other.

A roller ball extends through the vertical front face of the shell. The roller ball controls cursor movement according to a clock face system. Pressure on different parts of the roller ball moves the cursor in different directions. For example, pressure on the twelve o'clock position of the roller ball moves the cursor upwards, pressure on the three o'clock position moves the cursor to the right and pressure on the nine o'clock position moves the cursor to the left. Pressure on other positions of the roller ball moves the cursor in corresponding directions. The roller ball may be activated by either thumb pressing inward toward its respective forefinger to effect a fine movement control over the cursor. It is necessary to shift a control switch to provide for use of the unit as a mouse for a left-handed versus right-handed operator.

It is therefore an object of the present invention to combine a track ball and a mouse in a single housing.

It is another object of the present invention to combine a track ball and a mouse in a single housing with the combined unit being switchable between operating as a mouse and operating as a track ball.

It is still yet another object of the present invention to combine a track ball and a mouse in a single housing with the combined unit being switchable between operating as a mouse and operating as a track ball with at least one switch plate mounted on the unit for actuation of a computer function dependent upon a location of a cursor.

It is still yet another object of the present invention to combine a track ball and a mouse in a single housing with the combined unit being switchable between operating as a mouse and operating as a track ball with at least one switch plate mounted on the unit for actuation of a computer function dependent upon a location of a cursor and the unit used as a mouse is used by both left-handed and right-handed operators.

These and other objects of the invention, as well as many of the intended advantages thereof, will become more readily apparent when reference is made to the following description take in conjunction with the accompanying drawings.

DETAILED DESCRIPTION OF THE PREFERRED EMBODIMENT

Figure 1:
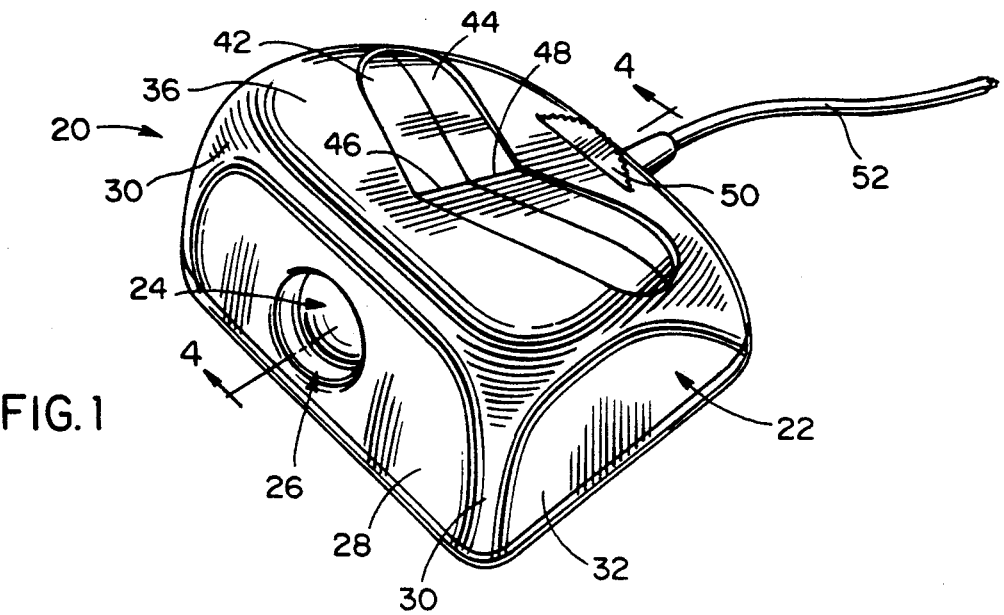
FIG. 1 is a perspective view of a combined mouse and track ball unit.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
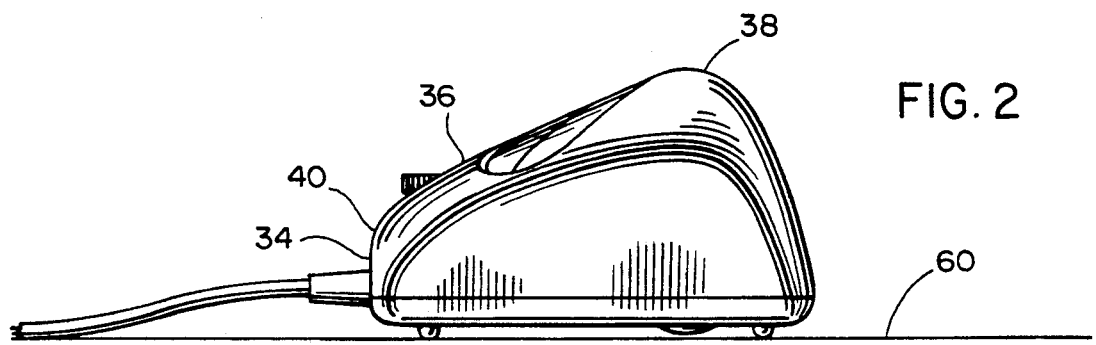
FIG. 2 is a side view thereof.
Figure 3:
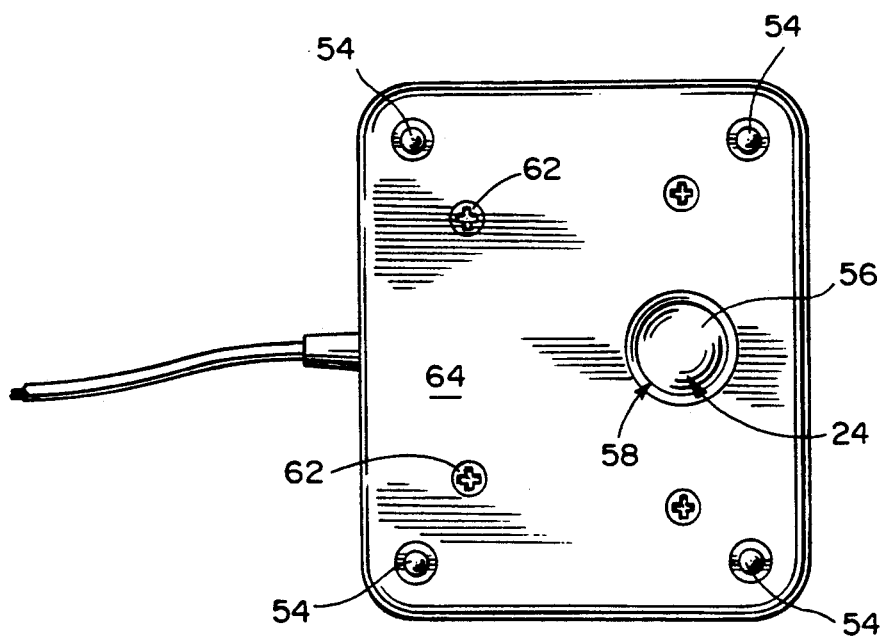
FIG. 3 is a bottom view thereof.

With reference to the drawings, in general, and to FIGS. 1 through 3, in particular, a combined mouse and track ball unit embodying the teachings of the subject invention is generally designated as 20. With reference to its orientation in FIG. 1, the combined track ball and mouse unit includes a housing or shell 22 which contains a roller ball 24 projecting through a lateral opening 26 defined in a front vertically rising surface 28 of the shell 22. On opposite lateral sides of the surface 28 are curved portions 30 which lead into vertically rising side surfaces 32. The side surfaces 32 are rounded at an opposite lateral edge to that of curved portions 30 to join with vertically rising rear surface 34.

The top surface 36 as shown in FIG. 2 slopes rearwardly from upper curved edge 38 of curved portions 30 and tapers downwardly towards curved edge 40 intersecting top surface 36 and vertically rising rear surface 34. The overall curvature of the shell 22 is such that the shell fits comfortably in the palm of the hand of the operator with the thumb aligned to engage the roller ball 24 and the forefinger and/or middle finger to lie above one of the two switch plates 42 and 44.

The switch plates 42, 44 are V-shaped and extend across the entire width of the top surface 36. The switch plates 42 44 are pivoted about a central fulcrum 46, 48, respectively.

A thumb wheel 50 protrudes from a lower portion of the top surface 36. The thumb wheel is rotated for control of the unit to operate as either a mouse or as a track ball.

Extending rearwardly from vertically rising rear surface 34 is an electrical connection line 52 which is connected to a computer for transmission of electric signals to convey changes in coordinates for a cursor of a computer terminal connected to the computer. By rotation of the roller ball 24, by the thumb of the operator passing into the opening 26 defined in the surface 28, the unit 20 is operated as a track ball.

To convert the unit 20 to operation as a mouse, the unit 20 is pressed downward so that the bullet switches 54 located on the bottom of the unit are depressed and are locked in a retracted position within the shell 22. With the bullet switches retracted, a lowermost peripheral surface 56 of the roller ball 24, which protrudes through an opening 58 in the bottom of the shell, is lowered to engage with a surface 60 upon which the unit rests. In FIG. 3, four bullet switches 54 are shown, however, it is only necessary that two bullet switches located along a leading edge of the unit be used with the trailing edge of the unit contacting the plane of the surface upon which the unit is placed.

Figure 4:
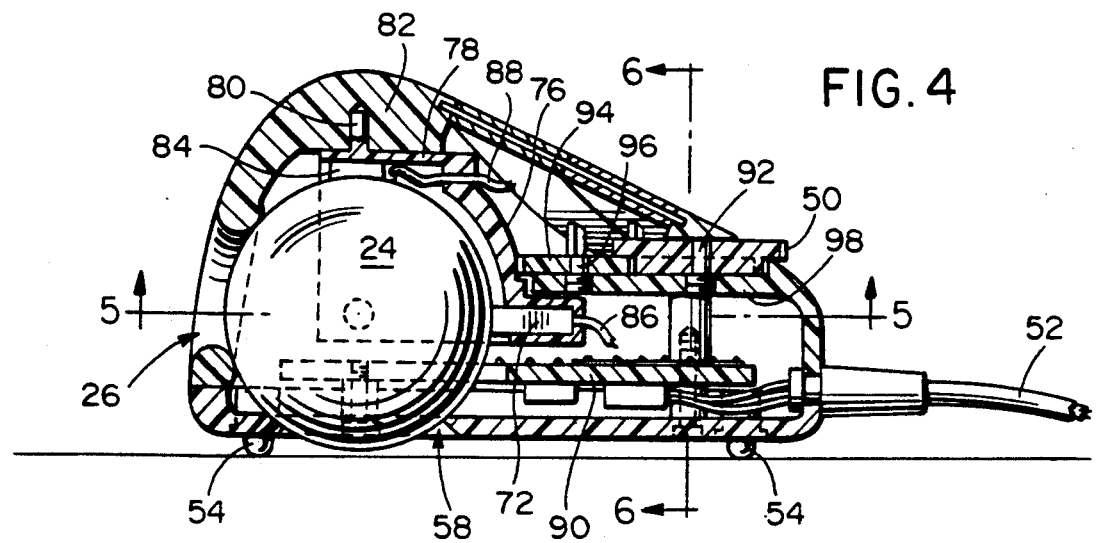
FIG. 4 is a cross-sectional view taken along line 4—4 of FIG. 1.
Figure 10:
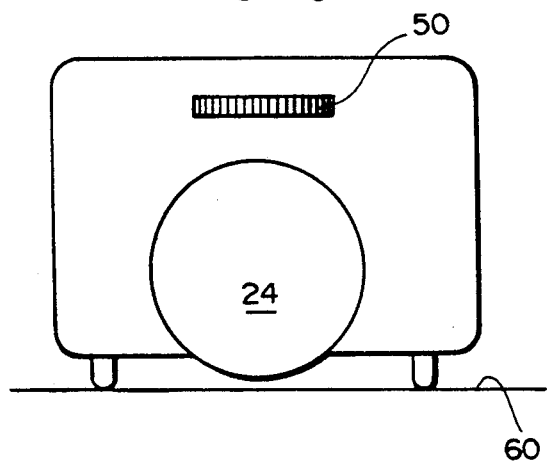
FIG. 10 illustrates the combined mouse and track ball unit in a track ball mode.
Figure 11:
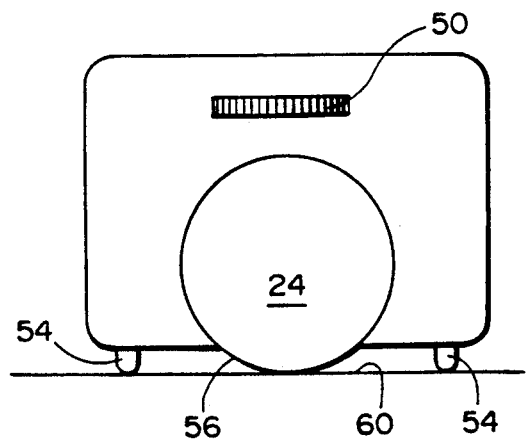
FIG. 11 illustrates the combined mouse and track ball unit in a mouse mode.

In FIGS. 2, 4 and 10, the unit is shown as it would be to be operated as a track ball since the lowermost peripheral surface 56 of the roller ball 24 is elevated above the surface 60. However, in FIG. 11, it is shown that when the bullet switches 54 are retracted, the lowermost peripheral surface 56 of the roller ball 24 contacts the surface 60 for operation as a mouse.

Figure 5:
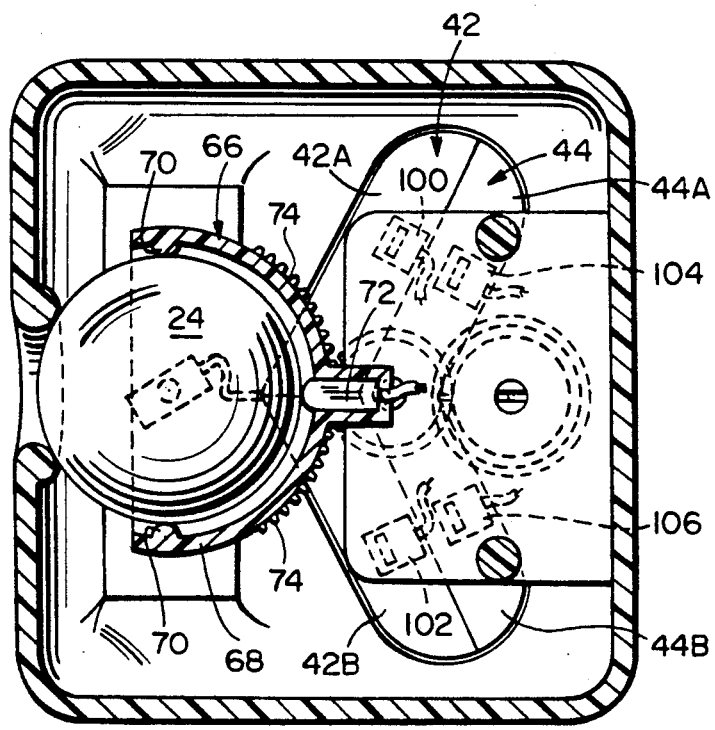
FIG. 5 is a cross-sectional view taken along line 5—5 of FIG. 4.
Figure 6:
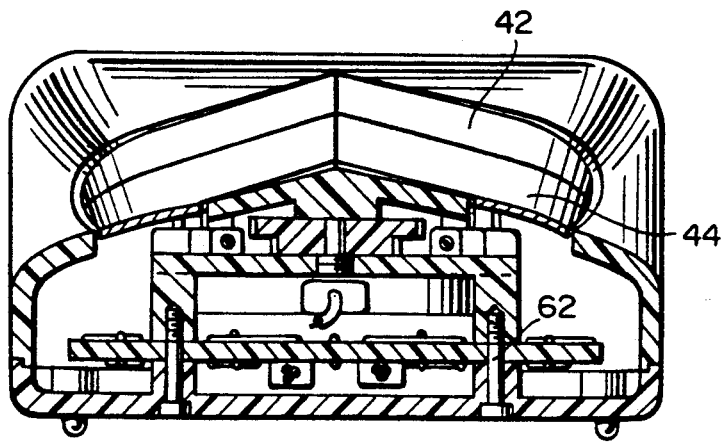
FIG. 6 is a sectional view taken along line 6—6 of FIG. 4.

By removal of screws 62 extending from the bottom 64 into the shell, the bottom 64 can be removed so that the roller ball 24 can be inserted within a yoke 66 as shown in FIG. 5 and extend through opening 26 in the surface 28 and through opening 58 in the bottom 64 of the unit 20.

The yoke 66 includes semi-circular portion 68 having two radially inwardly projecting tabs 70 for engagement with a peripheral surface of the roller ball 24. A first pickup sensor 72 is mounted in the semi-circular portion 68 for engagement with a rear peripheral surface of the roller ball. In the position shown for the pickup sensor 72 in FIGS. 4 and 5, the unit is operated as a track ball.

The semi-circular portion 68 includes a plurality of radially outwardly extending teeth 74 for shifting the position of the yoke for changing the operation of the unit from a track ball to a mouse or from a mouse to a track ball. As shown in FIG. 4, an arm 76 of the yoke extends upwardly from the semi-circular portion 68 of the yoke. A laterally extending arm portion 78 connects arm 76 to a pivot pin 80 secured within the wall 82 of the unit 20.

Located below the pivot pin 80 and the arm extension 78 is a second pickup sensor 84 which engages the roller ball 24 at a highest peripheral surface of the roller ball. The pickup sensor 84 is also pivotable with the yoke 66.

As is known for the operation of a mouse, the change of position of the roller ball turns two slotted wheels mounted at right angles to each other and which are rotated by rotation of a roller of the pickup sensor which contacts the roller ball. Each wheel includes two light-emitting diodes and two photodiodes. As the wheels turn, light shines through the slots and produces an electric signal in the photodiodes. The signals from the wheels are transmitted by electrical wires 86, 88, for each pickup sensor 72, 74, respectively, to a circuit board 90 and then transmitted to the computer for processing by electrical connection line 52 containing several electrical transmission wires.

The yoke 66 is pivoted about pivot pin 80 for shifting the position of the pickup sensor 72 with respect to the roller ball dependent upon the use of the unit as a mouse or as a track ball and when used as a mouse, if being used by a left-handed or a right-handed operator. Thumb wheel 50 includes three detents. One locks the thumb wheel in a central position for operation of the unit as a track ball. Of the two additional detents, one is located on each side of the central position of the thumb wheel used for operation of the unit as a track ball, so as to operate the unit as a mouse for a left-handed and a right-handed operator.

Rotation of the thumb wheel 50 about its shaft 92 causes rotation of a gear 94 about its shaft 96. Shafts 92 and 96 are anchored in a horizontal extension plate 98 extending inwardly from rear surface 34 of the shell. The teeth of gear 94 engage with the teeth 74 of the semi-circular, portion 68 of the yoke 66. Since the gear 94 is interposed between the thumb wheel 50 and the teeth 74 of the semi-circular portion 68, rotation of the thumb wheel 50 in one direction causes rotation of the yoke in the same direction. Of course, the gear 94 will rotate in an opposite direction to that of both the thumb wheel and the semi-circular portion 68 of the yoke 66.

Figure 7:
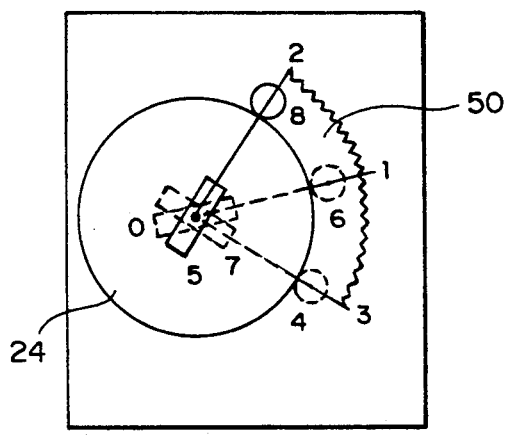
FIG. 7 is a schematic view of two pickup sensors changeable in position by rotation of a thumb wheel.

As schematically shown in FIG. 7, when the thumb wheel 50 is located in position No. 1, it is the stop position of the thumb wheel for track ball usage. This position is shown in FIG. 5 and schematically shown as position No. 6 for the pickup sensor 72 for horizontal motion pickup of track ball usage.

Shifting the thumb wheel 50 to position No. 2 shifts the pickup sensor 72 to position No. 8 for the horizontal motion pickup for use of the unit as a mouse for a right-handed operator. Similarly, shifting the position of the thumb wheel to position No. 3, the pickup sensor 72 is shifted to position No. 4 for usage of the unit as a mouse with a left-handed operator.

Similarly, during rotation of the thumb wheel, the vertical motion pickup sensor 84 would be shifted between positions 0, 5 and 7, respectively.

Figure 8:
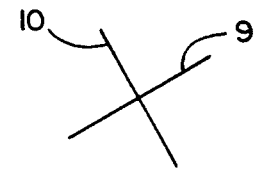
FIGS. 8 and 9 schematically illustrate a differentiation of orientation of the X-Y coordinates about which a cursor is moved by rotation of a roller ball.

In FIG. 8, line 9 schematically represents an up or down thumb actuated rotation of the roller ball in a track ball operation to produce vertical cursor movement. Similarly, line 10 simulates side-to-side thumb actuated movement of the roller ball to provide horizontal cursor movement.

Figure 9:
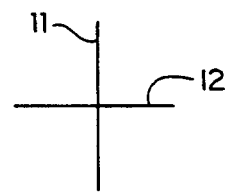

By the shifting of the thumb wheel 50, for example to position No. 3, line 11 of FIG. 9 now represents front-to-back mouse movement to produce vertical cursor movement and line 12 illustrates lateral mouse movement to produce horizontal cursor movement. Comparison of FIGS. 8 and 9 shows the change of the path of movement of the roller ball to produce similar vertical and horizontal cursor movement between mouse and track ball usage.

When the cursor is moved to be positioned above an icon on the screen of the computer terminal, and an indication is to be made to the computer that the function represented by the icon is to be performed, either switch plate 42 or 44 is actuated. As shown in FIG. 5, both switch plates 42 and 44 are V-shaped and extend between opposite sides of the unit. Depression of side 42A of switch plate 42 causes actuation of a microswitch 100 by a right-handed operator. When the unit is used by a left-handed operator, switch portion 42B is actuated to engage microswitch 102. Microswitches 100 and 102 transmit a similar signal to the computer to indicate that switch plate 42 has been depressed. Similarly, switch plate 44 includes portions 44A and 44B with microswitches 104 and 106, respectively, for indication of depression of the switch plate 44.

By the positioning of the switch plates 42 and 44 across the unit, not only can left and right-handed operators be accommodated, but also while being used by a right-handed child, whose fingers may not reach sufficiently across the unit to actuate switch portion 42A, may depress switch portion 42B and cause actuation of microswitch 102. Therefore, it is only critical that the thumb wheel 50 be properly positioned when the unit is used as a mouse for a right-handed or left-handed operator, solely for proper alignment of the movement of the roller ball as converted to movement of a cursor on a computer terminal.

Advantageously, the shape of the shell is such that the fingers of the operator are in a prehensile position for relieving fatigue and providing a comfortable fit to the hand of the operator. The sculpted shape of the unit thereby is aesthetically pleasing and as well as functional.

Having described the invention, many modifications thereto will become apparent to those skilled in the art to which it pertains without deviation from the spirit of the invention as defined by the scope of the appended claims.

I claim:

1. A cursor control unit comprising:
   a shell,
   a roller ball rotatably mounted in said shell, said roller ball extending through two openings in said shell, and
   shift means for elevating and lowering said shell so that said shell is usable as a mouse in a first position of said shift means and said shell is usable as a track ball in a second position of said shift means,
   two pickup sensors in contact with said roller ball with one of said two pickup sensors being movable,
   said one pickup sensor being movable between a first position for use of the shell as a track ball, a second position for use of the shell as a mouse with left-handed operators, and a third position for use of the shell as a mouse with right-handed operators.

2. A cursor control unit according to claim 1, wherein said shell includes at least one switch plate extending substantially across an entire width of said shell with said at least one switch plate being usable by a left or right-handed operator by contacting different portions of said at least one switch plate.

3. A cursor control unit according to claim 2, wherein said shell is shaped to align a hand of an operator cradling said shell in their palm so that the fingers are located adjacent to said at least one switch plate and the thumb is adjacent to one of said two openings in said shell with the thumb and the fingers located in a prehensile position.

4. A combined mouse and track ball unit comprising:
   a shell,
   a roller ball rotatably mounted in said shell and extending through two openings in said shell,
   shift means for shifting use of said roller ball between use as a mouse and use as a track ball, and
   two pickup sensors contacting said roller ball and being movable dependent upon use of said roller ball as a mouse or as a track ball,
   said shell being shaped symmetrically to align either hand of an operator cradling said shell in their palm so that the fingers are located on top of said shell and the thumb is located adjacent to one of said two openings in said shell with the thumb and the fingers located in a prehensile position.

5. A combined mouse and track ball unit according to claim 4, wherein said shell includes at least one switch plate extending substantially across an entire width of said shell with said at least one switch plate being usable by a left or right-handed operator by contacting different portions of said at least one switch plate.

6. A combined mouse and track ball unit according to claim 4, wherein said shell includes means for elevating and lowering said shell with respect to a planar surface.

7. A cursor control unit comprising:
   a shell,
   a roller ball rotatably mounted in said shell, said roller ball extending through two openings in said shell, and
   shift means for elevating and lowering said shell so that said shell is usable as a mouse in a first position of said shift means and said shell is usable as a track ball in a second position of said shift means,
   at least one switch plate extending substantially across an entire width of said shell with said at least one switch plate being usable by a left or right-handed operator by contacting different portions of said at least one switch plate, and
   said shell being symmetrically shaped to align either hand of an operator cradling said shell in their palm so that the fingers are located adjacent to said at least one switch plate and the thumb is adjacent to one of said two openings in said shell with the thumb and the fingers located in a prehensile position.

8. A cursor control unit according to claim 7 wherein said roller ball contacts two pickup sensors.

9. A cursor control unit according to claim 8, wherein one of said two pickup sensors is movable.

10. A cursor control unit according to claim 9, wherein said one pickup sensor is movable between a first position for use of the shell as a track ball, a second position for use of the shell as a mouse with left-handed operators, and a third position for use of the shell as a mouse with right-handed operators.

11. A cursor control unit comprising:
    a shell,
    a roller ball rotatably mounted in said shell, said roller ball extending through two openings in said shell, and
    shift means for elevating and lowering said shell so that said shell is usable as a mouse in a first position of said shift means and said shell is usable as a track ball in a second position of said shift means,
    at least one switch plate on said shell with said at least one switch plate being usable by a left or right-handed operator, and
    said shell being symmetrically shaped to align either hand of an operator cradling said shell in their palm so that the fingers are located adjacent to said at least one switch plate and the thumb is adjacent to one of said two openings in said shell with the thumb and the fingers located in a prehensile position.

12. A cursor control unit according to claim 11, wherein said roller ball contacts two pickup sensors.

13. A cursor control unit according to claim 11, wherein one of said two pickup sensors is movable.

14. A cursor control unit according to claim 13, wherein said one pickup sensor is movable between a first position for use of the shell as a track ball, a second position for use of the shell as a mouse with left-handed operators, and a third position for use of the shell as a mouse with right-handed operators.

* * * * *